(12) United States Patent
Kodama

(10) Patent No.: US 11,343,403 B2
(45) Date of Patent: May 24, 2022

(54) IMAGE FORMING APPARATUS

(71) Applicant: SHARP KABUSHIKI KAISHA, Sakai (JP)

(72) Inventor: Hirotaka Kodama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/149,339

(22) Filed: Jan. 14, 2021

(65) Prior Publication Data

US 2021/0227090 A1    Jul. 22, 2021

(30) Foreign Application Priority Data

Jan. 21, 2020    (JP) .............................. JP2020-007614

(51) Int. Cl.
*H04N 1/32*    (2006.01)
*H04N 1/00*    (2006.01)
*H04N 1/44*    (2006.01)

(52) U.S. Cl.
CPC ..... *H04N 1/32507* (2013.01); *H04N 1/00244* (2013.01); *H04N 1/00413* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2012/0200876 A1* | 8/2012 | Furuta | ................ | H04N 1/32406 358/1.13 |
| 2012/0320412 A1* | 12/2012 | Yoshimura | ............ | G06F 3/1204 358/1.15 |
| 2015/0261482 A1* | 9/2015 | Takano | ................. | G06F 3/1287 358/1.15 |

FOREIGN PATENT DOCUMENTS

JP    2017-159610 A    9/2017

* cited by examiner

*Primary Examiner* — Frantz Bataille
(74) *Attorney, Agent, or Firm* — ScienBiziP, P.C.

(57) ABSTRACT

An image forming apparatus shared by users in multiple groups includes a communication unit, a memory, a user authorizer, an operation unit, a display, an image former, and a controller. When the operation unit accepts a command for forming an image from a first user based on spooled image data of the first user stored in a spool area in the memory after the user authorizer has authorized the first user, the controller causes the display to display, in addition to the spooled image data of the first user, spooled image data received by the communication unit, from other users belonging to the same group as the first user. When the operation unit accepts selection and a print command of the spooled image data, the controller causes the image former to collectively form images based on the selected spooled image data.

6 Claims, 10 Drawing Sheets

FIG. 6

| JOB ID | USER ID | PASSWORD | GROUP ID |
|---|---|---|---|
| J0001 | U0001 | P＊＊1 | G02 |
| J0002 | U0002 | P＊＊2 | G02 |
| J0003 | U0003 | P＊＊3 | G02 |
| J0004 | U0004 | P＊＊4 | G02 |
| J0005 | U0005 | P＊＊5 | G01 |

SELECT JOB TO BE PRINTED

| # | FILE NAME | USER ID | DATE AND TIME OF RECEPTION |
|---|---|---|---|
| ☐ 1 | APPROVAL.docx | U0001 | 2019/01/15 13:01 |
| ☐ 2 | REPORT.docx | U0002 | 2019/01/15 13:05 |
| ☐ 3 | QUOTATION.xlsx | U0003 | 2019/01/15 13:31 |
| ☐ 4 | DAILY_REPORT (JAN_14).docx | U0004 | 2019/01/15 14:05 |

SELECT ALL     CANCEL     PRINT

FIG. 8

| JOB ID | USER ID | PASSWORD | GROUP ID | PRINT SHARING |
|---|---|---|---|---|
| J0001 | U0001 | P***1 | G02 | VALID |
| J0002 | U0002 | P***2 | G02 | VALID |
| J0003 | U0003 | P***3 | G02 | INVALID |
| J0004 | U0004 | P***4 | G02 | INVALID |
| J0005 | U0005 | P***5 | G01 | VALID |

SELECT JOB TO BE PRINTED

| # | FILE NAME | USER ID | DATE AND TIME OF RECEPTION |
|---|---|---|---|
| ☐ 1 | APPROVAL.docx | U0001 | 2019/01/15 13:01 |
| ☐ 2 | REPORT.docx | U0002 | 2019/01/15 13:05 |

SELECT ALL   CANCEL   PRINT

FIG. 10

| JOB ID | USER ID | PASSWORD | GROUP ID | AUTHORIZATION |
|--------|---------|----------|----------|---------------|
| J0001  | U0001   | P✱✱1     | G02      | LOW LEVEL     |
| J0002  | U0002   | P✱✱2     | G02      | LOW LEVEL     |
| J0003  | U0003   | P✱✱3     | G02      | LOW LEVEL     |
| J0004  | U0004   | P✱✱4     | G02      | HIGH LEVEL    |
| J0005  | U0005   | P✱✱5     | G01      | LOW LEVEL     |

SELECT JOB TO BE PRINTED

| # | FILE NAME | USER ID | DATE AND TIME OF RECEPTION |
|---|-----------|---------|----------------------------|
| ☐ 1 | APPROVAL.docx | U0001 | 2019/01/15 13:01 |
| ☐ 2 | REPORT.docx | U0002 | 2019/01/15 13:05 |
| ☐ 3 | QUOTATION.xlsx | U0003 | 2019/01/15 13:31 |

SELECT ALL     CANCEL     PRINT

FIG. 12

| JOB ID | USER ID | PASSWORD | GROUP ID | PRINT SHARING | AUTHORIZATION |
|---|---|---|---|---|---|
| J0001 | U0001 | P✳✳1 | G02 | ENABLED | HIGH LEVEL |
| J0002 | U0002 | P✳✳2 | G02 | ENABLED | LOW LEVEL |
| J0003 | U0003 | P✳✳3 | G02 | DISABLED | LOW LEVEL |
| J0004 | U0004 | P✳✳4 | G02 | DISABLED | HIGH LEVEL |
| J0005 | U0005 | P✳✳5 | G01 | ENABLED | LOW LEVEL |

SELECT JOB TO BE PRINTED

| # | FILE NAME | USER ID | DATE AND TIME OF RECEPTION |
|---|---|---|---|
| ☐ 1 | APPROVAL.docx | U0001 | 2019/01/15 13:01 |
| ☐ 2 | REPORT.docx | U0002 | 2019/01/15 13:05 |
| ☐ 3 | QUOTATION.xlsx | U0003 | 2019/01/15 13:31 |

[ SELECT ALL ]   [ CANCEL ]   [ PRINT ]

FIG. 14

| JOB ID | USER ID | PASSWORD | GROUP ID | PRINT SHARING | AUTHORIZATION |
|---|---|---|---|---|---|
| J0001 | U0001 | P✱✱1 | G02 | ENABLED | LOW LEVEL |
| J0002 | U0002 | P✱✱2 | G02 | ENABLED | LOW LEVEL |
| J0003 | U0003 | P✱✱3 | G02 | DISABLED | LOW LEVEL |
| J0004 | U0004 | P✱✱4 | G02 | ENABLED | HIGH LEVEL |
| J0005 | U0005 | P✱✱5 | G01 | ENABLED | LOW LEVEL |

SELECT JOB TO BE PRINTED

| # | FILE NAME | USER ID | DATE AND TIME OF RECEPTION |
|---|---|---|---|
| ☐ 1 | APPROVAL.docx | U0001 | 2019/01/15 13:01 |
| ☐ 2 | REPORT.docx | U0002 | 2019/01/15 13:05 |

SELECT ALL    CANCEL    PRINT

FIG. 16

| JOB ID | USER ID | PASSWORD | GROUP ID | PRINT SHARING | AUTHORIZATION |
|---|---|---|---|---|---|
| J0001 | U0001 | P***1 | G02 | ENABLED | HIGH LEVEL |
| J0002 | U0002 | P***2 | G02 | ENABLED | LOW LEVEL |
| J0003 | U0003 | P***3 | G02 | DISABLED | LOW LEVEL |
| J0004 | U0004 | P***4 | G02 | ENABLED | HIGH LEVEL |
| J0005 | U0005 | P***5 | G01 | ENABLED | LOW LEVEL |

SELECT JOB TO BE PRINTED

| # | FILE NAME | USER ID | DATE AND TIME OF RECEPTION |
|---|---|---|---|
| ☐ 1 | APPROVAL.docx | U0001 | 2019/01/15 13:01 |
| ☐ 2 | REPORT.docx | U0002 | 2019/01/15 13:05 |

SELECT ALL     CANCEL     PRINT

IMAGE FORMING APPARATUS

BACKGROUND OF THE INVENTION

Field of the Invention

The present invention relates to an image forming apparatus.

Description of the Background Art

There has been known image forming apparatuses, such as multifunction peripherals (MFPs) that have a function (hereinafter referred to as "spool function") for temporarily saving received image data in storage areas (hereinafter referred to as "spool areas"), such as hard disk drives (HDDs) of servers and MFPs, without immediate printing of the image data on sheets.

In an MFP having such a spool function, the image data can be temporarily stored in the spool area without being printed on a sheet, to prevent the sheet from being left in the sheet tray for a long time.

After logging in to the MFP, a user can instruct the printing of the image data stored in the spool area (spooled image data), to print the image data when necessary.

When an MFP having such a spool function is to be used in a company office, a meeting room, or the like, the user is an employee or staff member belonging to a group in the same organization. Therefore, in consideration of convenience, the MFP is set so that anyone can freely print the spooled image data in many cases.

In contrast, when an MFP having a spool function is shared in a shared workspace, a rented office space, or the like among users of multiple different groups, it is necessary to prevent users of other groups from printing the spooled image data due to problems regarding security, privacy, and the like.

In regard to such a problem, there is a known image forming apparatus that enters a standby state when it receives a print request from a user without immediate printing specified by the print request, releases the standby state in response to detection of an operation by the user who sent the print request, and executes printing based on the print request (for example, refer to Japanese Unexamined Patent Publication No. 2017-159610).

The conventional method of printing spool image data of only a specified user requires each user to perform login authorization, and then the spooled image data of each user to be individually printed.

Therefore, when users of multiple groups share one MFP in a shared workspace, a rented office space, or the like, each user must perform login authorization in order to print his or her spooled image data. As a result, there is a problem in that the waiting time extended, causing inconvenience to the user.

The present invention, which has been made in consideration of the above circumstances, provides an image forming apparatus that is more convenient for users than conventional ones in using the image forming apparatus shared by users of multiple groups in a shared workspace, a rented office space, or the like where users of multiple different groups gather.

SUMMARY OF THE INVENTION (1) An image forming apparatus shared by users in multiple groups, includes a communication unit that receives image data from the users via a network; a memory that has a spool area for temporarily storing the image data received by the communication unit as spooled image data; a user authorizer that authorizes the users based on login information preliminarily stored in the memory; an operation unit that accepts commands from the users; a display that displays an operation menu related to image formation of the image data; an image former that forms an image based on the image data; and a controller that controls the communication unit, the memory, the user authorizer, the operation unit, the display, and the image former, wherein, when the operation unit accepts a command for forming an image from a first user based on the spooled image data of the first user stored in the spool area after the user authorizer has authorized the first user, the controller causes the display to display, in addition to the spooled image data of the first user, spooled image data received by the communication unit, from other users belonging to the same group as the first user, and when the operation unit accepts selection and a print command of the spooled image data, the controller causes the image former to collectively form images based on the selected spooled image data.

The term "image forming apparatus" in the present invention refers to an apparatus that forms and outputs an image, such as a copier or a multifunction device that has a copy function (e.g., a printer that forms a toner image through an electrophotographic scheme), or a multifunction peripheral (MFP) that has functions besides the copy function.

According to the present invention, when spooled image data sent from a first user is to be printed with an image forming apparatus shared by users in multiple groups in a shared workspace, a rented office space, or the like where users of multiple groups gather, spooled image data of the other users belonging to the same group as the first user can also be printed. Therefore, an image forming apparatus having higher user convenience than before is realized.

Preferred modes of the present invention will be described in the following.

(2) The operation unit may accept, from each of the users, a setting for whether or not to enable sharing of the spooled image data between users belonging to the same group; when the operation unit accepts, from the first user authorized by the user authorizer, a command for forming an image based on the spooled image data of the first user stored in the spool area, the controller may cause the display to display spooled image data corresponding to the accepted setting for enabling sharing among the items of spooled image data received by the communication unit, from the other users belonging to the same group as the first user; and when the operation unit accepts selection and a print command of the spooled image data, the controller may cause the image former to collectively form images based on the selected spooled image data.

In this way, when the spooled image data sent by the first user is to be printed with the image forming apparatus shared by users of multiple groups, the items of spooled image data that have been enabled for print sharing, among the items of spooled image data of the other user belonging to the same group as the first user can also be printed. Therefore, it is possible to realize an image forming apparatus that is more convenient for users than before.

(3) The operation unit may accept a setting for an authorization level of each of the users; when the operation unit accepts, from the first user authorized by the user authorizer, a command for forming an image based on the spooled image data of the first user stored in the spool area, the controller may cause the display to also display spooled image data received by the communication unit, from the other users belonging to the same group as the first user and having a predetermined authorization level; and when the operation unit accepts selection and a print command of the spooled image data, the controller may cause the image former to collectively form images based on the selected spooled image data.

In this way, when the spooled image data sent by a first user is to be printed with the image forming apparatus shared by users of multiple groups, the items of spooled image data of the other user having a predetermined authorization level among the items of spooled image data of the other users belonging to the same group as the first user can also be printed. Therefore, it is possible to realize an image forming apparatus that is more convenient for users than before.

(4) When the operation unit accepts, from the first user authorized by the user authorizer, a command for forming an image based on the spooled image data of the first user stored in the spool area, the controller may cause the display to also display spooled image data received by the communication unit, from the other users belonging to the same group as the first user and having an authorization level that is the same as or lower than the authorization level of the first user; and when the operation unit accepts selection and a print command of the spooled image data, the controller may cause the image former to collectively form images based on the selected spooled image data.

In this way, when the spooled image data sent by the first user is to be printed with the image forming apparatus shared by users of multiple groups, the items of spooled image data of the other user having the same authorization level or a lower authorization level as the first user, among the items of spooled image data of the other user belonging to the same group as the first user can also be printed. Therefore, it is possible to realize an image forming apparatus that is more convenient for users than before.

(5) The operation unit may accept a setting for an authorization level of each of the users; when the operation unit accepts, from the first user authorized by the user authorizer, a command for forming an image based on the spooled image data of the first user stored in the spool area, the controller may cause the display to also display spooled image data received by the communication unit, from the other users belonging to the same group as the first user and having an authorization level that is the same as or lower than the authorization level of the first user, even when a setting for enabling sharing is accepted for the spooled image data; and when the operation unit accepts selection and a print command of the spooled image data, the controller may cause the image former to collectively form images based on the selected spooled image data.

In this way, when the spooled image data sent by a first user is to be printed with the image forming apparatus shared by users of multiple groups, the items of spooled image data of the other user having a lower authorization level can also be printed, even when a setting for enabling sharing is accepted for the spooled image data. Therefore, it is possible to realize an image forming apparatus that is more convenient for users than before.

(6) When the operation unit accepts, from the first user authorized by the user authorizer, a command for forming an image based on the spooled image data of the first user stored in the spool area, the controller may cause the display to not display spooled image data received by the communication unit, from the other users belonging to the same group as the first user and having an authorization level that is higher than the authorization level of the first user, even when the spooled image data has accepted a setting for enabling sharing.

In this way, when the spooled image data sent by the first user with the image forming apparatus shared by users of multiple groups, the items of spooled image data of the other user having a higher authorization level cannot be printed, even when the other users belonging to the same group as the first user have enabled print sharing. Therefore, it is possible to realize an image forming apparatus that is more convenient for users than before.

BRIEF DESCRIPTION OF THE DRAWINGS

FIG. 6 is an example of job data indicating the relationship between a job ID, a user ID, a password, and a group ID of the digital multifunction peripheral in FIG. 1;

FIG. 7 is a diagram illustrating an example of a selection menu of a spooled job of the digital multifunction peripheral illustrated in FIG. 1;

FIG. 8 is an example of job data indicating the relationship between a job ID, a user ID, a password, a group ID, and a print sharing setting for a digital multifunction peripheral according to a second embodiment of the present invention;

FIG. 9 is a diagram illustrating an example of a selection menu for spooled jobs of a digital multifunction peripheral according to the second embodiment of the present invention;

FIG. 10 is an example of job data indicating the relationship between a job ID, a user ID, a password, a group ID, and a user authorization of a digital multifunction peripheral according to a third embodiment of the present invention;

FIG. 11 is a diagram illustrating an example of a selection menu of a spooled job of the digital multifunction peripheral according to the third embodiment of the present invention;

FIG. 12 is an example of job data indicating the relationship between a job ID, a user ID, a password, a group ID, a print sharing setting, and a user authorization of a digital multifunction peripheral according to a fourth embodiment of the present invention;

FIG. 13 is a diagram illustrating an example of a selection menu of a spooled job of the digital multifunction peripheral according to the fourth embodiment of the present invention;

FIG. 14 is an example of job data indicating the relationship between a job ID, a user ID, a password, a group ID, a print sharing setting, and a user authorization of a digital multifunction peripheral according to a fifth embodiment of the present invention;

FIG. 15 is a diagram illustrating an example of a selection menu of a spooled job of a digital multifunction peripheral according to the fifth embodiment of the present invention;

FIG. 16 is an example of job data indicating the relationship between a job ID, a user ID, a password, a group ID, a print sharing setting, and a user authorization of a digital multifunction peripheral according to a sixth embodiment of the present invention; and FIG. 17 is a diagram illustrating an example of a selection menu of a spooled job of the digital multifunction peripheral according to the sixth embodiment of the present invention.

DESCRIPTION OF THE PREFERRED EMBODIMENTS

The present invention will now be described in detail with reference to the accompanying drawings. Note that the following explanations are mere examples in all respects, and should not be construed as limiting the present invention.

First Embodiment

A schematic configuration of a digital multifunction peripheral 1, which is an embodiment of an image forming apparatus according to the present invention, will now be described with reference to FIGS. 1 and 2.

Figure 1:
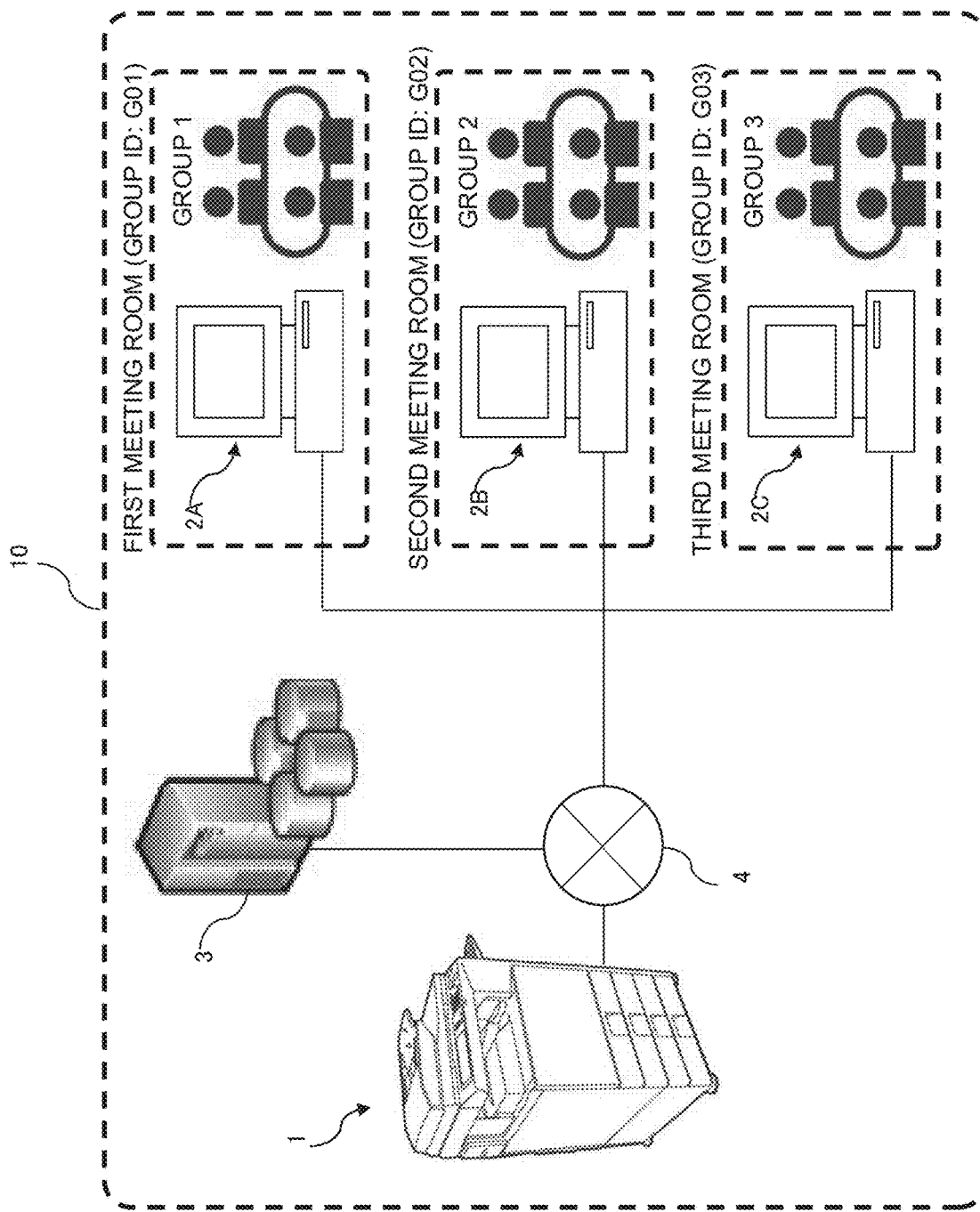
FIG. 1 is a diagram illustrating an example of a configuration of an image forming system according to the present invention.

FIG. 1 is a diagram illustrating an example of the configuration of an image forming system 10 according to the present invention. FIG. 2 is a block diagram illustrating the schematic configuration of the digital multifunction peripheral 1 in FIG. 1.

As illustrated in FIG. 1, the image forming system 10 of the present invention includes a digital multifunction peripheral 1, a PC 2A, a PC 2B, a PC 2C, and a server 3 connected to each other via a network 4.

Note that in the following description, the PC 2A, the PC 2B, and the PC 2C will be collectively referred to as "PCs 2." However, the number of PCs 2 is not limited to three and may be any number.

In the example of FIG. 1, the PC 2A is installed in the first meeting room and used by the users of Group 1; the PC 2B is installed in a second meeting room and used by the users of Group 2; and the PC 2C is used in a third meeting room and used by the users of Group 3.

In the example in FIG. 1, one group uses one PC 2. Alternatively, one group may use multiple PCs 2.

For example, one group may use multiple PCs 2 in multiple rooms, for example, Group 1 may use the first and second meeting rooms.

The digital multifunction peripheral 1 is an apparatus, such as a multifunction device or a multifunction peripheral (MFP) that digitally processes image data and has a copy function, a printer function, a scanner function, and a facsimile function.

Figure 2:
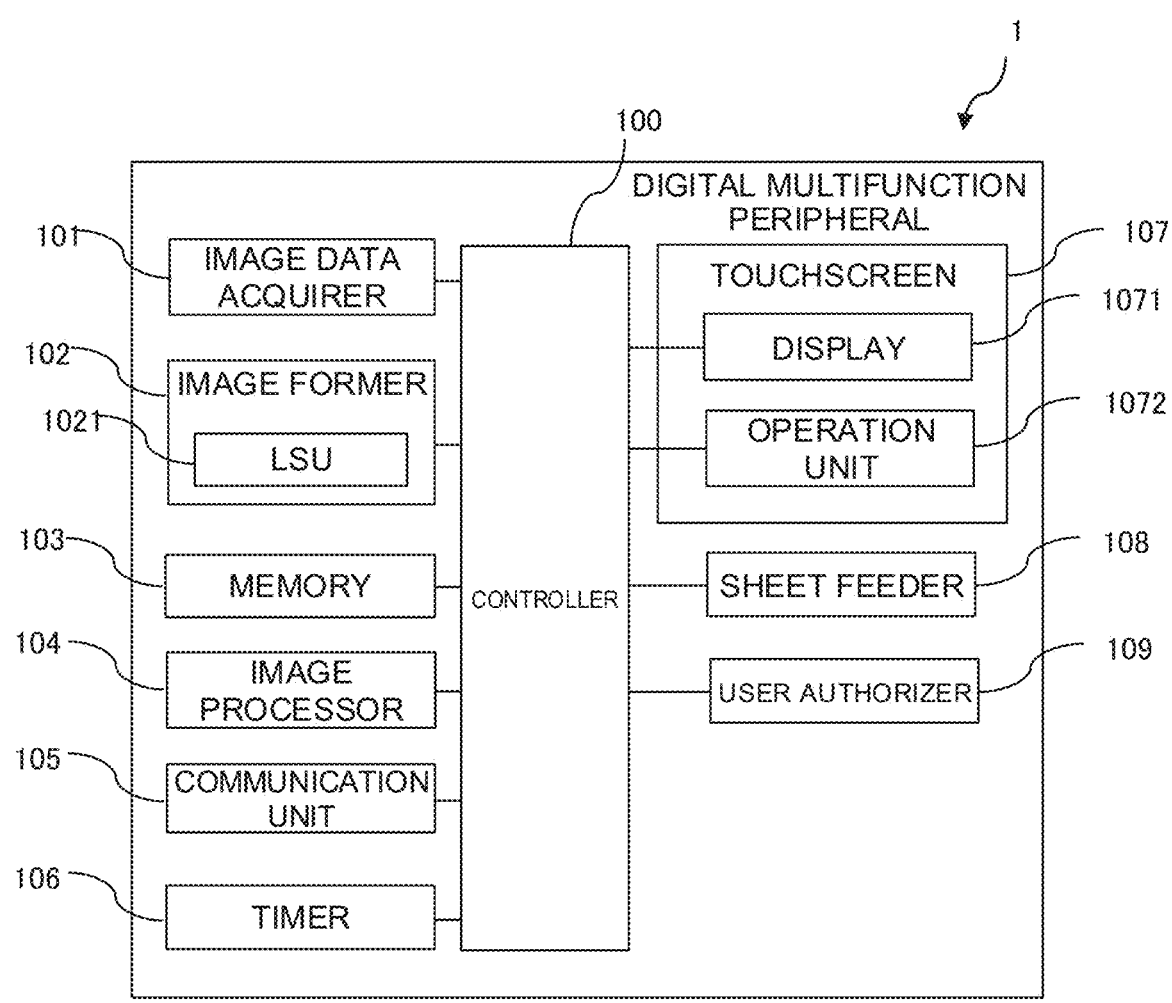
FIG. 2 is a block diagram illustrating a schematic configuration of the digital multifunction peripheral in FIG. 1.

As illustrated in FIG. 2, the digital multifunction peripheral 1 includes a controller 100, an image data acquirer 101, an image former 102, a memory 103, an image processor 104, a communication unit 105, a timer 106, a touch screen 107, and a sheet feeder 108, and a user authorizer 109.

Each component of the digital multifunction peripheral 1 will now be described.

The controller 100 comprehensively controls the digital multifunction peripheral 1. The controller 100 includes a CPU, a RAM, a ROM, various interface circuits, etc.

The controller 100 monitors and controls all loads, such as detection of sensors, the motor, the clutch, the touch screen 107, etc., in order to comprehensively control the operation of the digital multifunction peripheral 1.

The image data acquirer 101 is a portion that detects and reads a document placed on a document table or a document transported from the sheet tray and generates image data.

The image data acquirer 101 is a portion that acquires image data generated by external devices, such as the PCs 2, via a wired or wireless network 4.

The image former 102 is a portion that prints out the image data acquired by the image data acquirer 101 and processed by the image processor 104, onto a sheet. The image former 102 includes an LSU 1021.

The LSU 1021 irradiates the surfaces of photoconductor drums in a charged state with laser light corresponding to image data information consisting of digital signals, to form an electrostatic latent image.

The memory 103 is a device or a storage medium that stores information needed for realizing various functions of the digital multifunction peripheral 1, a control program, etc. For example, the memory 103 is a storage medium, such as a semiconductor device (e.g., a RAM or a ROM), a hard disk, a flash memory, a storage media, or an SSD.

The memory 103 stores information related to jobs such as printing and data necessary for the executing jobs, such as image data.

The memory 103 has a spool area for temporarily storing print/facsimile data.

The memory 103 stores information, such as login names and passwords of users stored for user authorization.

Note that the executing jobs program and the data may be stored on different devices. For example, the area holding the data may be composed of a hard disk drive, and the area holding the program may be composed of a flash memory.

The image processor 104 is a portion that carries out processing for converting the image data input from the image data acquirer 101 into an appropriate electrical signal on the basis of an analysis result of a command for a job, such as printing, acquired through the communication unit 105, so that the electrical signal suits output, such as enlargement/reduction, etc.

The communication unit 105 is a portion that communicates with the external PCs 2 and the server 3 via the network 4 to acquire job commands, such as printing, image data for printing, etc.

The communication unit 105 communicates with other image forming devices, personal digital assistants, information processing devices, fax machines, etc., and sends and receives various items of information, such as e-mails and facsimiles, to and from these external devices.

The timer 106 measures and counts the time. The time is acquired through, for example, a built-in clock or the network 4.

The touch screen 107 includes a display panel including a liquid crystal panel or the like and a capacitance type touch screen or the like that is disposed on the display panel and detects the position where a finger has touched. The touch screen 107 further includes a display 1071 and an operation unit 1072.

The display 1071 is a portion that displays various types of information.

The display 1071 includes, for example, a CRT display, a liquid crystal display, or an EL display. The display 1071 is a display device, such as a monitor or a line display, which displays electronic data, such as operating status of the operating system and the application software.

The controller 100 displays the operation and status of the digital multifunction peripheral 1 through the display 1071.

The operation unit 1072 is an interface for operating the digital multifunction peripheral 1, and is a portion that accepts commands from a user.

The sheet feeder 108 transports sheets stored in a sheet feed cassette and manual feed tray to the image former 102.

The user authorizer 109 is a portion that compares the information such as the login name and password input from the operation unit 1072 with corresponding information preliminarily recorded in the memory 103 to authorize a user to be a qualified user.

The user authorizer 109 may authorize a user to be a qualified user on the basis of information such as a user ID read from a user's IC card through a card interface unit (not illustrated).

Overall Configuration of PC 2

The schematic configuration of a PC 2 will now be described with reference to FIG. 3.

Figure 3:
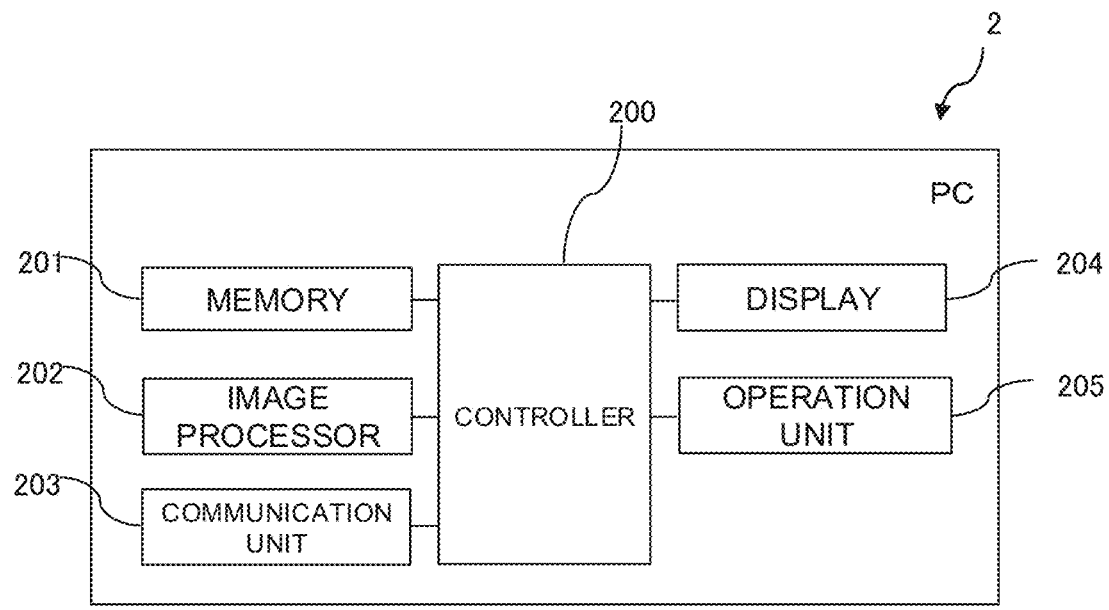
FIG. 3 is a block diagram illustrating a schematic configuration of the PC in FIG. 1.

FIG. 3 is a block diagram illustrating the schematic configuration of the PC 2 in FIG. 1.

As illustrated in FIG. 3, the PC 2 includes a controller 200, a memory 201, an image processor 202, a communication unit 203, a display 204, and an operation unit 205.

Note that the controller 200, the memory 201, the image processor 202, the communication unit 203, the display 204, and the operation unit 205 have the same configurations as those of the controller 100, the memory 103, the image processor 104, the communication unit 105, the display 1071, and the operation unit 1072 in FIG. 2, respectively. Therefore, the descriptions thereof are not repeated.

The PC 2 is not limited to a terminal permanently installed in each meeting room, and may alternatively be, for example, a mobile terminal, such as a notebook PC, brought in from the outside by the user.

Overall Configuration of Server 3

The schematic configuration of the PC 2 will now be described with reference to FIG. 4.

Figure 4:
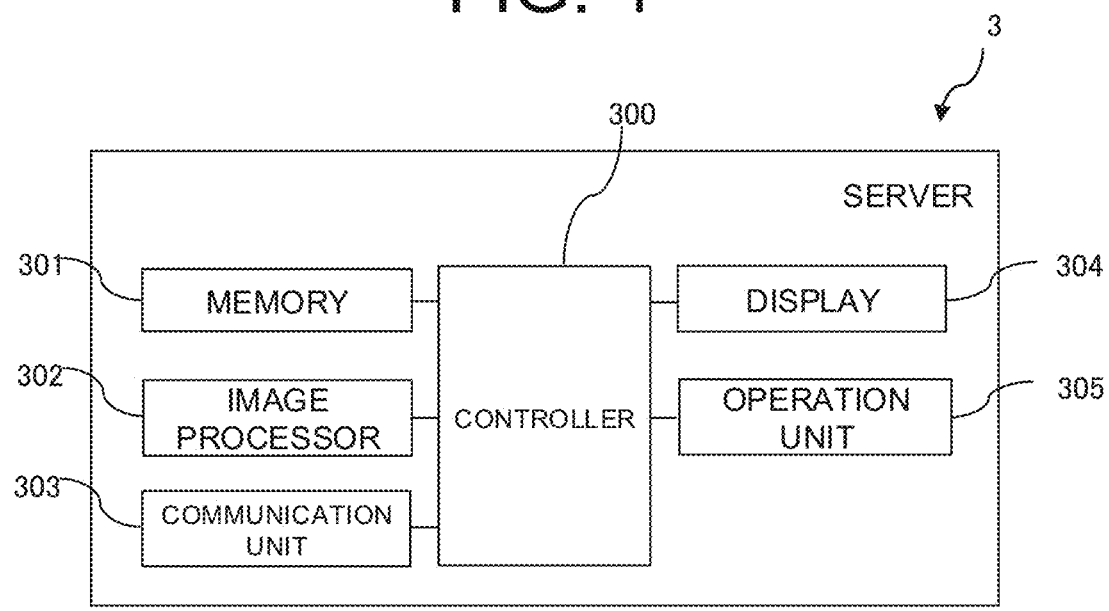
FIG. 4 is a block diagram illustrating a schematic configuration of a server in FIG. 1.

FIG. 4 is a block diagram illustrating the schematic configuration of the server 3 in FIG. 1.

The server 3 is a device such as a management server connected to the digital multifunction peripheral 1 via the network 4.

Alternatively, the server 3 may be a cloud server configured on a cloud.

As illustrated in FIG. 4, the server 3 includes a controller 300, a memory 301, an image processor 302, a communication unit 303, a display 304, and an operation unit 305.

The configuration of each component of the server 3 is the same as that of the PC 2. Therefore, the description is not repeated.

The controller 300 of the server 3 temporarily stores the image data received from each PC 2 by the communication unit 303 in the memory 301 for the group to which each PC 2 belongs, and sends the image data required in response to a print request from the digital multifunction peripheral 1 to the communication unit 303.

Note that the processing of the server 3 may be performed directly by the digital multifunction peripheral 1 without going through the server 3.

Example of Printing Processing of Spooled Image Data of Digital Multifunction Peripheral 1 of First Embodiment of Present Invention An example of printing processing of spooled image data of the digital multifunction peripheral 1 according to the first embodiment of the present invention will now be described with reference to FIGS. 5 to 7.

Figure 5:
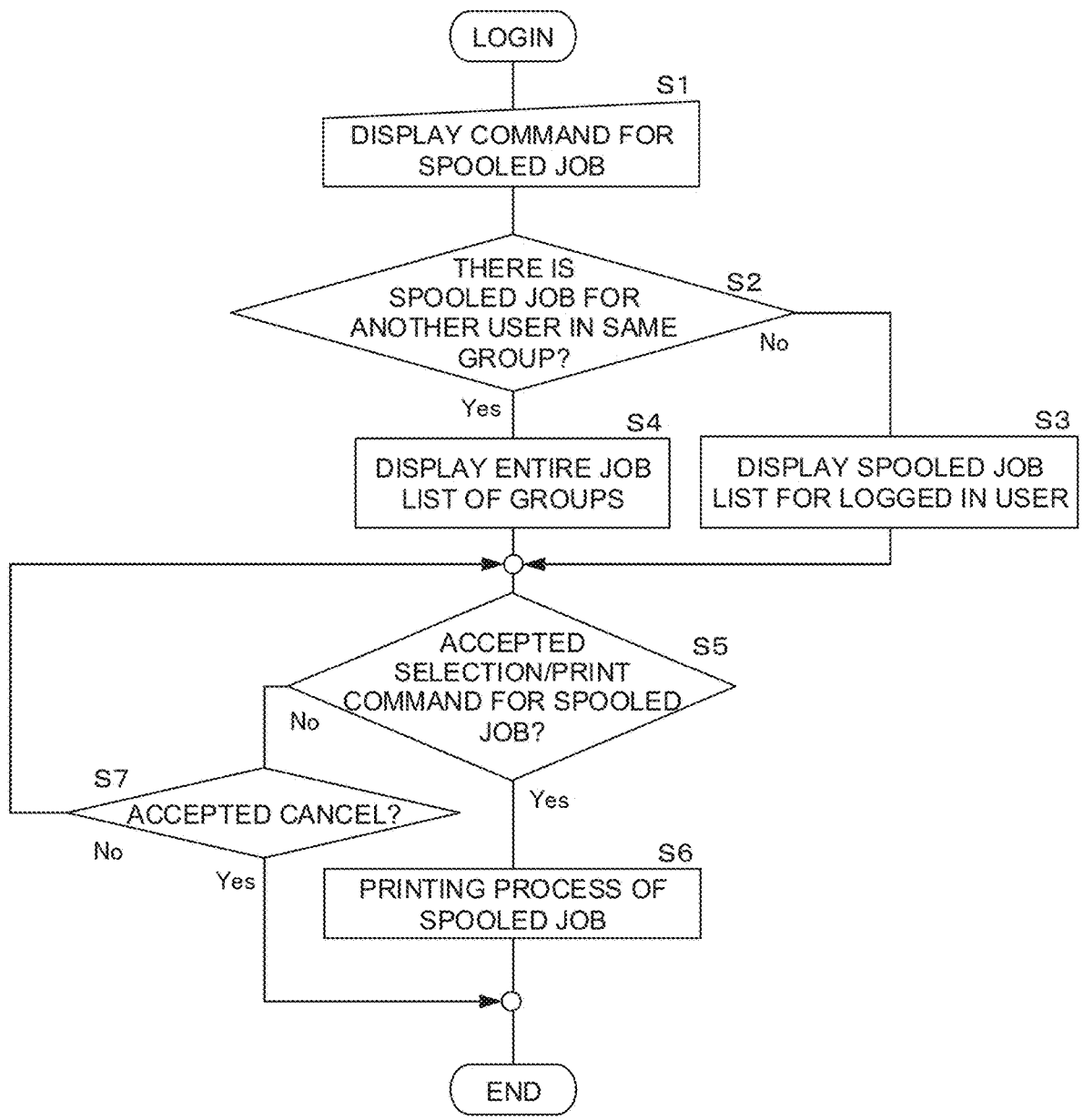
FIG. 5 is a flowchart illustrating the flow of execution processing of a spooled job after login to the digital multifunction peripheral in FIG. 1.

FIG. 5 is a flowchart illustrating the flow of execution processing of a spooled job after login to the digital multifunction peripheral 1 in FIG. 1. FIG. 6 is an example of job data indicating the relationship between a job ID, a user ID, and a group ID of the digital multifunction peripheral 1 in FIG. 1. FIG. 7 is a diagram illustrating an example of a selection menu of a spooled job of the digital multifunction peripheral 1 illustrated in FIG. 1.

FIG. 5 illustrates the processing after the operation unit 1072 of the digital multifunction peripheral 1 accepts a login operation by the user.

In step S1 of FIG. 5, if the operation unit 1072 accepts a display command of a print job (hereinafter referred to as a "spooled job") of which spooled image data is stored in the spool area of the memory 103 of the digital multifunction peripheral 1 (step S1), the controller 100 of the digital multifunction peripheral 1 determines, in the subsequent step S2, whether or not a spooled job of another user belonging to the same group as the logged-in user is stored in the spool area, in addition to the spool job of the login user (step S2).

The controller 100 references the group ID associated with the user ID of each user to determine whether or not another user belongs to the same group as the logged-in user.

However, if no spooled job of the logged-in user or another user belonging to the same group as the logged-in user is in the spool area of the memory 103, the controller 100 may display nothing on the display 1071.

Alternatively, the controller 100 may automatically or manually end the display after displaying on the display 1071 that there is no spooled job.

After the operation unit 1072 has accepted a login operation by a user, the controller 100 may cause the display 1071 to display a spooled job list on the display 1071 even if the operation unit 1072 has not received the display command (step S1) for a spooled job from the user.

In FIG. 6, the "job ID" is an ID assigned to identify the print job sent from the PCs 2.

In the example of FIG. 6, five job IDs "J0001" to "J0005" are assigned in the order accepted by the digital multifunction peripheral 1.

The "user ID" is an ID assigned to each user.

In the example of FIG. 6, it is assumed that the user IDs of "U0001" to "U0005" are assigned to the five users.

The "password" is a password for logging in with the user ID.

In the example of FIG. 6, five passwords of "P*1" to "P*5" are set to correspond to the five user IDs of "U0001" to "U0005."

The "group ID" is an ID assigned to each group.

In the first embodiment, it is assumed that the group IDs of "G01" to "G03" are assigned to Groups 1 to 3.

The group ID assignment may be preset by a user.

Alternatively, when the user instructs the print job, the display 1071 may perform pop-up display of a message prompting the entering of the group ID.

A repeater, such as an access point, corresponding to each meeting room in FIG. 1 may be installed, and a group ID may be assigned in accordance with the access point through which the job has been transmitted.

In this way, a group ID can be automatically assigned to a print job sent from a mobile terminal, such as a notebook PC, brought in by a user from the outside.

Next, in step S2 of FIG. 5, if no spooled job of another user belonging to the same group as the logged-in user in addition to the spool job of the login user is stored in the spool area other than the spooled job of the logged-in user ("No" in step S2), the controller 100 causes the display 1071 to display a list of the spooled jobs of the logged-in user in step S3 (step S3).

The controller 100 then performs the determination in step S5 (step S5).

If a spooled job of another user belonging to the same group as the logged-in user in addition to the spool job of the login user is stored in the spool area in addition to the spooled job of the logged-in user ("Yes" in step S2), the controller 100 causes the display 1071 to display a list of spooled jobs of all users belonging to the same groups as the logged-in user as well as the spooled job of the logged-in user in step S4 (step S4).

The controller 100 then performs the determination in step S5 (step S5).

In step S5, the controller 100 determines whether or not the operation unit 1072 has accepted selection of a spooled job and a print command (step S5).

If the operation unit 1072 accepts selection of a spooled job and a print command ("Yes" in step S5), the controller 100 causes the image former 102 to execute printing processing of the selected spooled in the step S6 (step S6).

If the selection of the spooled job and the print command are not accepted ("No" in step S5), the controller 100 determines whether or not the operation unit 1072 has accepted a cancellation in the step S7 (step S7).

If the operation unit 1072 accepts a cancellation ("Yes" in step S7), the controller 100 ends the processing.

If the operation unit 1072 does not accept a cancellation ("No" in step S7), the controller 100 causes the processing to return to the determination of step S5 (step S5).

Here, the case in which the operation unit 1072 has not accepted a cancellation refers to the case in which the operation unit 1072 has accepted only an instruction of selection/cancellation of a check box, the case in which the operation of a "select all" key is accepted, the case in which an instruction of scrolling the spooled job list has been accepted, or the like.

In the first embodiment, it is assumed that four users belonging to Group 2 (group ID: G02) cause print image data to be sent from the PC 2B in the second meeting room to the digital multifunction peripheral 1 for printing.

Here, it is assumed that the users in the second meeting room are preliminarily assigned user IDs (U0001 to U0004) and passwords (P*1 to P*4).

The same applies to other meeting rooms.

The print commands and image data are sent from the PCs 2A to 2C in the first to third meeting rooms are temporarily stored on the server 3, and job IDs (J0001 to J0005) are assigned in the order of reception.

For example, the print job (job ID: J0001) sent by the user (user ID: U0001) of Group 2 is associated with the group ID: G02 of the second meeting room.

The print job (job ID: J0005) sent by the user (user ID: U0005) of Group 1 is associated with the group ID: G01 of the first meeting room.

With a conventional digital multifunction peripheral 1, a user is able to print only the spooled image data sent by himself or herself after login.

For example, the user with the user ID (U0001) cannot print the spooled image data of another user even if the other user belongs to the same Group 2, and login authorization is required for each user to prints his or her spooled job. Therefore, the convenience of the user was not high.

In order to solve such a problem, in the digital multifunction peripheral 1 of the first embodiment of the present invention, not only the spooled image data of the logged-in user but also the spooled image data of the other users belonging to the same group as the logged are displayed on the display 1071 so as to accept print instructions.

Specifically, when the spooled image data sent by the user (ID: U0001) is to be printed, the spooled image data of the other users (ID: U0002 to U0004) belonging to the same group (ID: G02) is also displayed on the display 1071, as illustrated in FIG. 7.

In this case, the spooled image data of the user (ID: U0001) is only the "approval.docx" of Job 1, but, as illustrated in the example of FIG. 7, jobs of the other users belonging to the same group (ID: G02) as the user (ID: U0001) (i.e., job 2 "report.docx" of a user (ID: U0002), job 3 "quotation.xlsx" of a user (ID: U0003), and job 4 "daily_report(Jan_14).docx of a user (ID: U0004)) are also displayed on the display 1071.

The user can select and print the desired data by checking the image data to be printed out of the items of spooled image data and pressing the "print" key.

The user can also select all items of the image data by pressing the "select all" key.

The user can cancel the printing of the spooled image by pressing the "cancel" key.

In this way, when the spooled image data sent by a first user is to be printed with the digital multifunction peripheral 1 shared by users of multiple groups, the spooled image data of the other users belonging to the same group as the first user can also be printed. Therefore, it is possible to realize a digital multifunction peripheral 1 that is more convenient for users than before.

Second Embodiment

An example of printing processing of spooled image data of the digital multifunction peripheral 1 according to the second embodiment of the present invention will now be described with reference to FIGS. 8 and 9.

FIG. 8 is an example of job data indicating the relationship between a job ID, a user ID, a password, a group ID, and a print sharing setting for the digital multifunction peripheral 1 according to the second embodiment of the present invention. FIG. 9 is a diagram illustrating an example of a selection menu of a spooled job of a digital multifunction peripheral 1 according to the second embodiment of the present invention.

In the second embodiment, it is possible to set whether or not the print sharing of spooled image data should be enabled between users of the same group.

The settings of "job ID," "user ID," "password," and "group ID" in FIG. 8 are the same as those in FIG. 6 (first embodiment), but differ from that of the first embodiment in that there is a setting for "print sharing."

Each user preliminarily sets whether to enable or disable the print sharing of spooled image data.

Alternatively, when the user instructs the print job, the display 1071 may perform pop-up display of a message prompting the entering of the print sharing setting.

In FIG. 8, it is assumed that the users whose user IDs are U0001, U0002, and U0005 set the print sharing to "enabled," and the other users set the print sharing to "disabled."

At this time, when the spooled image data sent by the user (ID: U0001) with the digital multifunction peripheral 1 is to be printed, the spooled image data of the user (ID: U0002) who set the print sharing to "enabled" among the other users (ID: U0002 to U0004) belonging to the same group (ID: G02) is also displayed on the display 1071, as illustrated in FIG. 9.

Therefore, even when items of spooled image data are of the same group, print sharing of such items of spooled image data can be disabled so that the items of spooled image data that should not be subjected to print sharing are not printed together with the other items of spooled image data of the same group.

In this way, when the spooled image data sent by a first user is to be printed with the digital multifunction peripheral 1 shared by users of multiple groups, the spooled image data of the other users who have enabled the print sharing out of the spooled image data of the other users belonging to the same group can also be printed. Therefore, it is possible to realize a digital multifunction peripheral 1 that is more convenient for users than before.

Third Embodiment

An example of printing processing of spooled image data of the digital multifunction peripheral 1 according to the third embodiment of the present invention will now be described with reference to FIGS. 10 and 11.

FIG. 10 is an example of job data indicating the relationship between a job ID, a user ID, a password, a group ID, and a user authorization of a digital multifunction peripheral according to the third embodiment of the present invention. FIG. 11 is a diagram illustrating an example of a selection menu of a spooled job of a digital multifunction peripheral 1 according to the third embodiment of the present invention.

In the third embodiment, the authorization level of each user can be set.

The settings of "job ID," "user ID," "password," and "group ID" in FIG. 10 are the same as those in FIG. 8 (second embodiment), but differ from that of the second embodiment in that further the "authorization" of each user can be set.

Each user has "lower" or "higher" authorization levels. Alternatively, the authorization level may be classified into three or more levels such as "higher," "middle," and "lower."

In the third embodiment, when a first user sends spooled image data to the digital multifunction peripheral 1 for printing, spooled image data sent by the other users having authorization levels that are the same as or lower than the authorization level of the first user can be printed together, but spooled image data sent by the other users having authorization levels higher than the first user cannot be printed together.

In FIG. 10, it is assumed that the user whose user ID is U0004 has the authorization level set to "higher," and the other users have the authorization level set to "lower."

At this time, when a first user (ID: U0001) having a lower authorization level is to print the spooled image data sent by the first user with the digital multifunction peripheral 1, the spooled image data of the users (ID: U0002 and U0003) having lower authorization levels among the other users (ID: U0002 to U0004) belonging to the same group (ID: G02) is also displayed on the display 1071, as illustrated in FIG. 11.

When a first user sends spooled image data to the digital multifunction peripheral 1 for printing, spooled image data sent by the other users having authorization levels that are lower than the authorization level of the first user can be printed together, but spooled image data sent by the other users having authorization levels higher than or the same as the first user cannot be printed together.

In this case, as in the example of FIG. 10, the spool image data of the other users (ID: U0002 to U0004) belonging to the same group (ID: G02) is not displayed on the display 1071.

When a first user sends spooled image data to the digital multifunction peripheral 1 for printing, for example, spooled image data sent by the other users having a predetermined level of authorization, such as spooled image data sent by the other users having authorization levels that are the same as the authorization level of the first user or spooled image data sent by the other users having authorization levels that are the higher than the authorization level of the first user, may be printed together.

In this way, when the spooled image data sent from a first user is to be printed with the digital multifunction peripheral 1 shared by users of multiple groups, the spooled image data of the other users who have a predetermined level of authorization out of the spooled image data of the other users belonging to the same group can also be printed. Therefore, it is possible to realize a digital multifunction peripheral 1 that is more convenient for users than before.

Fourth Embodiment

An example of printing processing of spooled image data of the digital multifunction peripheral 1 according to the fourth embodiment of the present invention will now be described with reference to FIGS. 12 and 13.

FIG. 12 is an example of job data indicating the relationship between a job ID, a user ID, a password, a group ID, a print sharing setting, and a user authorization of a digital multifunction peripheral 1 according to the fourth embodiment of the present invention. FIG. 13 is a diagram illustrating an example of a selection menu of a spooled job of a digital multifunction peripheral 1 according to the fourth embodiment of the present invention.

In the fourth embodiment, the print sharing setting and the authorization level of each user can be set.

In the fourth embodiment, the authorization of the user shall be prioritized over the print sharing setting.

For example, a first user who has a lower or higher authorization level cannot print the spool image data sent by the other users who have authorization levels that are the same as or higher than the first user, when the other users have disabled print sharing.

A first user who has a higher authorization level can print the spool image data sent by the other users who have authorization levels lower than the first user, even when the other users have disabled print sharing.

In FIG. 12, the users having user IDs U0003 and U0004 both set print sharing to "disabled," but these users differ in that the user of ID: U0003 has a lower authorization level, while the user of ID: U0004 has a higher authorization level.

Therefore, when a first user (ID: U0001) having a higher authorization level is to print the spooled image data sent by the first user with the digital multifunction peripheral 1, the spooled image data of the user (ID: U0002) who has a lower authorization level and has enabled print sharing and the spooled image data of the user (ID: U0003) who has a lower authorization level and has disabled the print sharing among the other users (ID: U0002 to U0004) belonging to the same group (ID: G02) are also displayed on the display 1071, as illustrated in FIG. 13.

In this way, when the spooled image data sent by a first user is to be printed with the digital multifunction peripheral 1 shared by users of multiple groups, the spooled image data of the other users who have a lower authorization level are also printed even when the other users belonging to the same group have disabled the print sharing. Therefore, it is possible to realize a digital multifunction peripheral 1 that is more convenient for users than before.

Fifth Embodiment

An example of printing processing of spooled image data of the digital multifunction peripheral 1 according to the fifth embodiment of the present invention will now be described with reference to FIGS. 14 and 15.

FIG. 14 is an example of job data indicating the relationship between a job ID, a user ID, a password, a group ID, a print sharing setting, and a user authorization of a digital multifunction peripheral 1 according to the fifth embodiment of the present invention. FIG. 15 is a diagram illustrating an example of a selection menu of a spooled job of a digital multifunction peripheral 1 according to the fifth embodiment of the present invention.

In the fifth embodiment, a user having a lower authorization level cannot print the spooled image data of users having a higher authorization level, regardless of the print sharing setting.

Since a user (ID: U0001) having a lower authorization level cannot print the spooled image data of a user (ID: U0004) having a higher authorization level, regardless of the print sharing setting, the spooled image data of the user (ID: U0004) having a higher authorization level is not displayed on the display 1071, as illustrated in FIG. 15, even when print sharing is enabled.

In this way, when the spooled image data sent by a first user is to be printed with the digital multifunction peripheral 1 shared by users of multiple groups, the spooled image data of the other users belonging to the same group who have a higher authorization level cannot be printed even when the other users have enabled the print sharing. Therefore, it is possible to realize a digital multifunction peripheral 1 that is more convenient for users than before.

Sixth Embodiment

An example of printing processing of spooled image data of the digital multifunction peripheral 1 according to the sixth embodiment of the present invention will now be described with reference to FIGS. 16 and 17.

FIG. 16 is an example of job data indicating the relationship between a job ID, a user ID, a password, a group ID, a print sharing setting, and a user authorization of a digital multifunction peripheral 1 according to the sixth embodiment of the present invention. FIG. 17 is a diagram illustrating an example of a selection menu of a spooled job of a digital multifunction peripheral 1 according to the sixth embodiment of the present invention.

In the sixth embodiment, the print sharing setting is prioritized over user authorization.

For example, a first user who has a higher authorization level cannot print the spool image data sent by the other users, when the other users have disabled the print sharing.

In FIG. 16, the user (ID: U0003) having a lower authorization level has set print sharing to "enabled."

Since the user (ID: U0001) having a higher authorization level cannot print the spooled image data when the print sharing is disabled even when a user (ID: U0003) has a lower authorization level, the spooled image data of the user (ID: U0003) is not displayed on the display 1071, as illustrated in FIG. 17.

In this way, when the spooled image data sent by a first user is to be printed with the digital multifunction peripheral 1 shared by users of multiple groups, the spooled image data of the other users belonging to the same group cannot be printed together when the other users have disabled the print sharing, regardless of the authorization level of the other users. Therefore, it is possible to realize a digital multifunction peripheral 1 that is more convenient for users than before.

Seventh Embodiment

In the seventh embodiment, login authorization may be performed using ID cards having different group IDs and authorization levels.

In such a case, when a user who has an ID card of a higher authorization level performs login authorization with the digital multifunction peripheral 1 using the ID card, the spooled image data of the other users of the same group may also be displayed on the display 1071.

In this way, when the spooled image data sent by a first user is to be printed with the digital multifunction peripheral 1 shared by users of multiple groups after login authorization by the ID card, the spooled image data of the other users belonging to the same group as the first user can also be printed. Therefore, it is possible to realize a digital multifunction peripheral 1 that is more convenient for users than before.

A preferred embodiment of the present invention also includes a combination of any of the above-mentioned embodiments.

Various modified examples of the present invention may be provided besides the above-described embodiments. These modifications should not be construed as not belonging to the scope of the present invention. The invention should include the meaning equivalent to the claims and all modifications within the scope.

What is claimed is:

1. An image forming apparatus shared by users in multiple groups, the apparatus comprising:
   a processor that receives image data from the users via a network;
   a memory that has a spool area for temporarily storing the image data received by the processor as spooled image data;
   a user authorizer that authorizes the users based on login information preliminarily stored in the memory;
   a touch screen that accepts commands from the users;
   a display that displays an operation menu related to image formation of the image data; and
   an image former that forms an image based on the image data,
   wherein the processor controls the memory, the user authorizer, the touch screen, the display, and the image former,
   when the touch screen accepts a command for forming an image from a first user based on the spooled image data of the first user stored in the spool area after the user authorizer has authorized the first user, the processor causes the display to display, in addition to the spooled image data of the first user, spooled image data received by the processor, from other users belonging to the same group as the first user so that the first user can solely select and print the spooled image data, and
   when the touch screen accepts selection and a print command of the spooled image data from the first user, the processor causes the image former to collectively form images based on the selected spooled image data.

2. The image forming apparatus according to claim 1, wherein, the touch screen accepts from each of the users a setting for whether or not to enable sharing of the spooled image data between users belonging to the same group, when the touch screen accepts, from the first user authorized by the user authorizer, a command for forming an image based on the spooled image data of the first user stored in the spool area, the processor causes the display to display spooled image data corresponding to the accepted setting for enabling sharing among the items of spooled image data received by the processor, from the other users belonging to the same group as the first user so that the first user can solely select and print the spooled image data, and when the touch screen accepts selection and a print command of the spooled image data from the first user, the processor causes the image former to collectively form images based on the selected spooled image data.

3. The image forming apparatus according to claim 1, wherein, the touch screen accepts a setting for an authorization level of each of the users, when the touch screen accepts, from the first user authorized by the user authorizer, a command for forming an image based on the spooled image data of the first user stored in the spool area, the processor causes the display to also display spooled image data received by the processor, from the other users belonging to the same group as the first user and having a predetermined authorization level so that the first user can solely select and print the spooled image data, and when the touch screen accepts selection and a print command of the spooled image data from the first user, the processor causes the image former to collectively form images based on the selected spooled image data.

4. The image forming apparatus according to claim 3, wherein, when the touch screen accepts, from the first user authorized by the user authorizer, a command for forming an image based on the spooled image data of the first user stored in the spool area, the processor causes the display to also display spooled image data received by the processor, from the other users belonging to the same group as the first user and having an authorization level that is the same as or lower than the authorization level of the first user so that the first user can solely select and print the spooled image data, and when the touch screen accepts selection and a print command of the spooled image data from the first user, the processor causes the image former to collectively form images based on the selected spooled image data.

5. The image forming apparatus according to claim 2, wherein the touch screen accepts a setting for an authorization level of each of the users, when the touch screen accepts, from the first user authorized by the user authorizer, a command for forming an image based on the spooled image data of the first user stored in the spool area, the processor causes the display to also display spooled image data received by the processor, from the other users belonging to the same group as the first user and having an authorization level that is the same as or lower than the authorization level of the first user, even when a setting for disabling sharing is accepted for the spooled image data so that the first user can solely select and print the spooled image data, and when the touch screen accepts selection and a print command of the spooled image data from the first user, the processor causes the image former to collectively form images based on the selected spooled image data.

6. The image forming apparatus according to claim 5, wherein when the touch screen accepts, from the first user authorized by the user authorizer, a command for forming an image based on the spooled image data of the first user stored in the spool area, the processor causes the display to not display spooled image data received by the processor, from the other users belonging to the same group as the first user and having an authorization level that is higher than the authorization level of the first user, even when a setting for enabling sharing is accepted for the spooled image data.

* * * * *